(12) United States Patent
Ito et al.

(10) Patent No.: US 12,484,129 B2
(45) Date of Patent: Nov. 25, 2025

(54) DETECTION APPARATUS AND DETECTION SYSTEM

(71) Applicant: Magnolia White Corporation, Tokyo (JP)

(72) Inventors: Kaoru Ito, Tokyo (JP); Akihiko Fujisawa, Tokyo (JP); Daichi Abe, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 42 days.

(21) Appl. No.: 18/735,991

(22) Filed: Jun. 6, 2024

(65) Prior Publication Data

US 2024/0414827 A1 Dec. 12, 2024

(30) Foreign Application Priority Data

Jun. 8, 2023 (JP) ................................. 2023-094861

(51) Int. Cl.
*H05B 47/10* (2020.01)
*H05B 47/11* (2020.01)
*H05B 47/16* (2020.01)
*H05B 47/17* (2020.01)

(52) U.S. Cl.
CPC ............. *H05B 47/11* (2020.01); *H05B 47/16* (2020.01); *H05B 47/17* (2020.01)

(58) Field of Classification Search
CPC ........ H05B 45/10; H05B 45/20; H05B 45/30; H05B 47/10; H05B 47/11; H05B 47/16; H05B 47/17
See application file for complete search history.

(56) References Cited

U.S. PATENT DOCUMENTS

2023/0028136 A1\* 1/2023 Lee ........................ H05B 47/20

FOREIGN PATENT DOCUMENTS

JP 2005-087005 A 4/2005

\* cited by examiner

*Primary Examiner* — Jimmy T Vu
(74) *Attorney, Agent, or Firm* — K&L Gates LLP

(57) ABSTRACT

A detection apparatus includes a sensor, a detection circuit, and a light source configured to emit light in a first color, a second color, and a third color. The detection circuit acquires a first output, a second output, and a third output that are outputs of the sensor corresponding to a period when the light in the first color is emitted, a period when the light in the second color is emitted, and a period when the light in the third color is emitted, respectively. The detection circuit adjusts at least two or more of the first, second, and third outputs based on adjustment coefficients derived so as to equalize a fourth output, a fifth output, and a sixth output. The fourth, fifth, and sixth outputs are outputs obtained when the sensor is directly irradiated with the light in the first, second, and third colors from the light source, respectively.

5 Claims, 13 Drawing Sheets

DETECTION APPARATUS AND DETECTION SYSTEM

CROSS-REFERENCE TO RELATED APPLICATION

This application claims the benefit of priority from Japanese Patent Application No. 2023-094861 filed on Jun. 8, 2023, the entire contents of which are incorporated herein by reference.

BACKGROUND

1. Technical Field

What is disclosed herein relates to a detection apparatus and a detection system.

2. Description of the Related Art

As described in Japanese Patent Application Laid-open Publication No. 2005-087005, detection apparatuses are known that enable detection of states of culture environments of biological tissues or microorganisms using an optical sensor.

In the detection apparatuses described above, color information can be added to detection results by providing light sources for a plurality of colors and performing the detection for each color of light. However, the light sources may have variations in luminance. Therefore, if the detection is performed without considering such variations in luminance, color tones affected by the variations in luminance are reflected in the detection results, and the detection accuracy of colors of the culture environments of the biological tissues or microorganisms serving as objects of the detection is reduced.

For the foregoing reasons, there is a need for a detection apparatus and a detection system capable of increasing the detection accuracy of colors.

SUMMARY

According to an aspect, a detection apparatus includes: a sensor that includes a photodiode to detect light and is configured to produce an output corresponding to a degree of the detected light; a detection circuit configured to acquire the output of the sensor; and a light source configured to switchably emit light in a first color, light in a second color, and light in a third color. The detection circuit is configured to individually acquire a first output, a second output, and a third output. The first output is an output of the sensor corresponding to a period when the light in the first color is emitted. The second output is an output of the sensor corresponding to a period when the light in the second color is emitted. The third output is an output of the sensor corresponding to a period when the light in the third color is emitted. The detection circuit is configured to adjust at least two or more of the first output, the second output, and the third output based on adjustment coefficients derived so as to equalize a fourth output, a fifth output, and a sixth output. The fourth output is an output obtained when the sensor is directly irradiated with the light in the first color from the light source. The fifth output is an output obtained when the sensor is directly irradiated with the light in the second color from the light source. The sixth output is an output obtained when the sensor is directly irradiated with the light in the third color from the light source.

DETAILED DESCRIPTION

Figure 1:
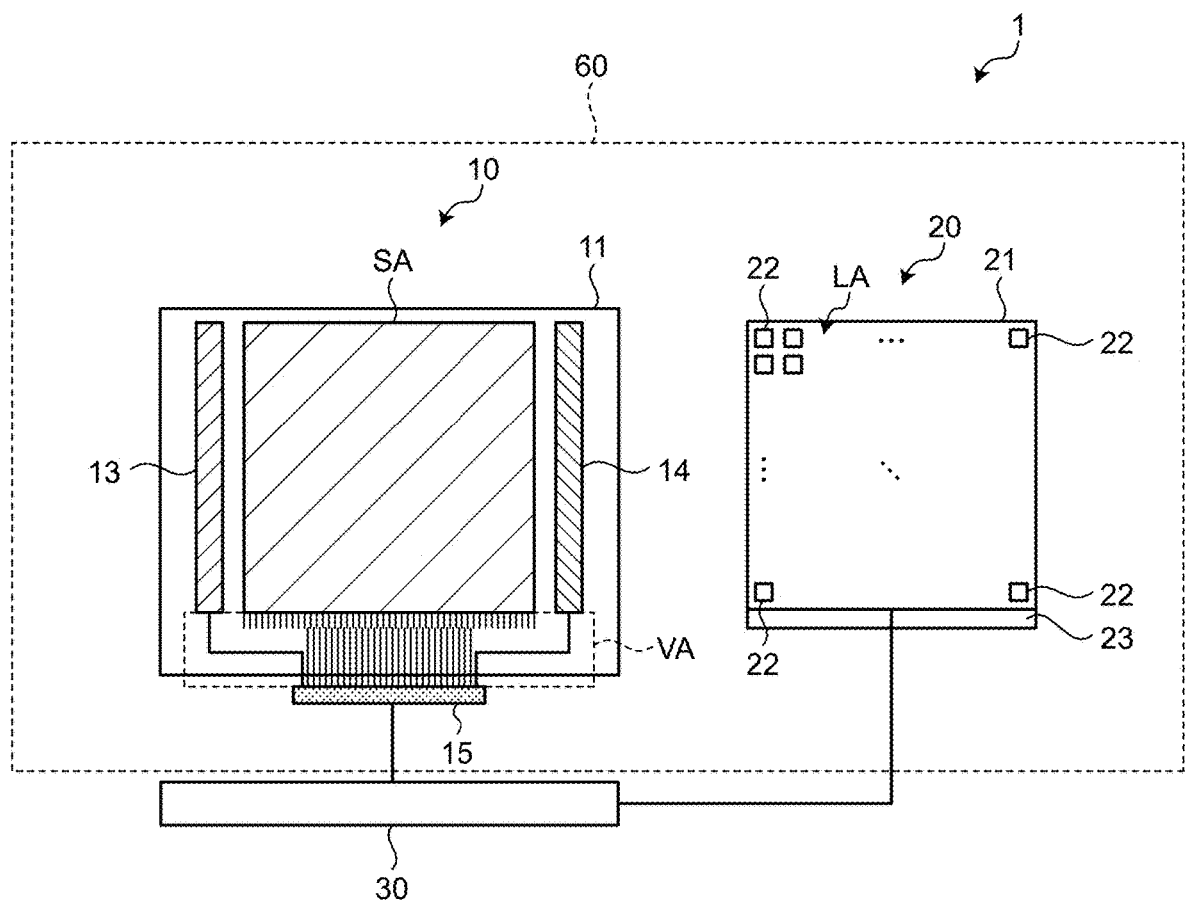
FIG. 1 is a diagram illustrating a main configuration of a detection system.

The following describes an embodiment of the present disclosure with reference to the drawings. What is disclosed herein is merely an example, and the present disclosure naturally encompasses appropriate modifications easily conceivable by those skilled in the art while maintaining the gist of the present invention. To further clarify the description, the drawings may schematically illustrate, for example, widths, thicknesses, and shapes of various parts as compared with actual aspects thereof. However, they are merely examples, and interpretation of the present disclosure is not limited thereto. The same element as that illustrated in a drawing that has already been discussed is denoted by the same reference numeral through the description and the drawings, and detailed description thereof may not be repeated where appropriate.

FIG. 1 is a diagram illustrating a main configuration of a detection system 1. The detection system 1 includes a detection apparatus 60 and an information processing device 30. The detection apparatus 60 includes a sensor panel 10 and a light source panel 20. The sensor panel 10 and the light source panel 20 of the detection system 1 are coupled to the information processing device 30.

The sensor panel 10 is provided with a detection area SA (refer to FIG. 2) on a substrate 11. A reset circuit 13, a scan circuit 14, and a wiring area VA are mounted on the substrate 11. Components on the detection area SA, the reset circuit 13, and the scan circuit 14 are coupled to a detection circuit 15 via the wiring area VA.

The light source panel 20 has a light-emitting area LA that emits light to the detection area SA. In the light source panel 20, a light source 22 is provided on a substrate 21. The light source 22 includes light-emitting elements such as light-emitting diodes (LEDs) and is located in the light-emitting area LA. In the example illustrated in FIG. 1, a plurality of the light sources 22 are arranged in a matrix having a row-column configuration on the substrate 21.

The light source panel 20 is provided with a light source drive circuit 23. Under the control of the information processing device 30, the light source drive circuit 23 controls whether to turn on the light sources 22 and controls the luminance of each light source 22 when the light source 22 is turned on. The light sources 22 may be provided so as to be individually controllable in light emission or may be provided so as to emit light all together.

The information processing device 30 performs various types of control related to the operation of the detection system 1. Specifically, the information processing device 30 is, for example, an information processing device applicable to the configuration of the detection system 1. The information processing device 30 is coupled to the detection circuit 15 via coupling means, such as communication via a wired, wireless, or wired and wireless mixed communication network, or a standardized interface, and obtains an output from the detection circuit 15. The information processing device 30 is coupled to the light source drive circuit 23 via such coupling means and performs processing related to the lighting of the light sources 22, such as determination of lighting patterns of the light sources 22.

Figure 2:
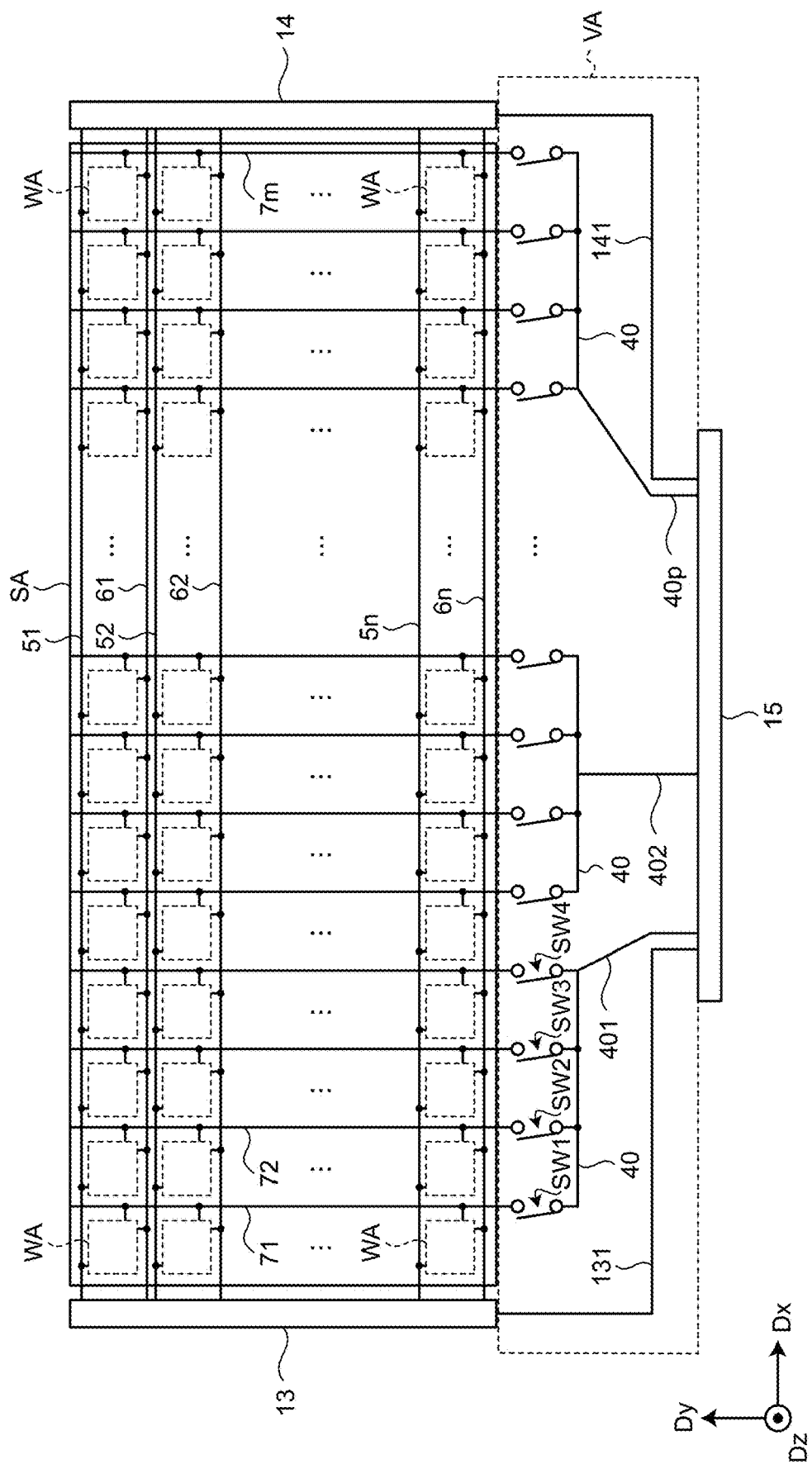
FIG. 2 is a diagram illustrating a configuration example of a detection area and a wiring area.

FIG. 2 is a diagram illustrating a configuration example of the detection area SA and the wiring area VA. A plurality of sensors WA (FIG. 3) are provided in the detection area SA. In the embodiment, as illustrated in FIG. 2, the sensors WA are arranged in a matrix having a row-column configuration along a first direction Dx and a second direction Dy. The first direction Dx is orthogonal to the second direction Dy. In the following description, the term "third direction Dz" refers to a direction orthogonal to the first direction Dx and the second direction Dy.

The reset circuit 13 is coupled to reset signal transmission lines 51, 52, . . . , 5n. Hereafter, the term "reset signal transmission line 5" refers to any one of the reset signal transmission lines 51, 52, . . . , 5n. The reset signal transmission line 5 is wiring along the first direction Dx. In the example illustrated in FIG. 2, n reset signal transmission lines 5 are arranged in the second direction Dy. n is a natural number equal to or larger than 2. The n reset signal transmission lines 5 are each coupled, at one end in the first direction Dx, to the reset circuit 13.

The scan circuit 14 is coupled to scan lines 61, 62, . . . , 6n. Hereafter, the term "scan line 6" refers to any one of the scan lines 61, 62, . . . , 6n. The scan line 6 is wiring along the first direction Dx. In the example illustrated in FIG. 2, n scan lines 6 are arranged in the second direction Dy. The n scan lines 6 are each coupled, at the other end in the first direction Dx, to the scan circuit 14.

As illustrated in FIG. 2, the reset signal transmission lines 5 and the scan lines 6 are alternately arranged in the second direction Dy in the detection area SA. The reset circuit 13 and the scan circuit 14 illustrated in FIGS. 1 and 2 are arranged at locations facing each other with the detection area SA interposed therebetween, but the layout of the reset circuit 13 and the scan circuit 14 is not limited to this layout and can be changed as appropriate.

Signal lines 71, 72, . . . , 7m are also provided in the detection area SA. Hereafter, the term "signal line 7" refers to any one of the signal lines 71, 72, . . . , 7m. The signal line 7 is wiring along the second direction Dy.

In the example illustrated in FIG. 2, m signal lines 7 are arranged in the first direction Dx. m is a natural number equal to or larger than 2. The m signal lines 7 are each coupled, at one end in the second direction Dy, to a corresponding one of a plurality of switches (for example, a switch SW1, a switch SW2, a switch SW3, and a switch SW4) included in a selector circuit 40.

The selector circuits 40 are provided in the wiring area VA. Each selector circuit 40 includes a plurality of switches. In the example illustrated in FIG. 2, the switches SW1, SW2, SW3, and SW4 are illustrated as the switches. The switches included in one selector circuit 40 are turned on (coupled state) at different times from one another. During a period when one of the switches included in one selector circuit 40 is on (coupled state), the other switches are off (decoupled state). The number of selector circuits 40 corresponds to the number (m) of the signal lines 7. When the number of the switches is p, m/p is sufficient as the number of the selector circuits 40. When more than one selector circuit 40 are provided, each of the selector circuits 40 is individually coupled to the detection circuit 15 via a corresponding one of wiring lines 401, 402, . . . , 40p.

The coupling between the signal lines 7 and the detection circuit 15 via the selector circuits 40 is merely an example and is not limited to this example. The signal lines 7 may be individually directly coupled to the detection circuit 15 in the wiring area VA. In the wiring area VA, the reset circuit 13 is coupled to the detection circuit 15 via wiring 131. In the wiring area VA, the scan circuit 14 is coupled to the detection circuit 15 via wiring 141.

The detection circuit 15 is concerned with the detection of light by a PD 82 (refer to FIG. 3) provided in each of the sensors WA and controls the operation timing of the reset circuit 13 and the scan circuit 14. The detection circuit 15 receives an output from the sensor WA. The detection circuit 15 converts signals received from the sensors WA into data that can be interpreted by the information processing device 30, and outputs the converted data to the information processing device 30. The detection circuit 15 of the embodiment is a micro-controller unit (MCU).

Figure 3:
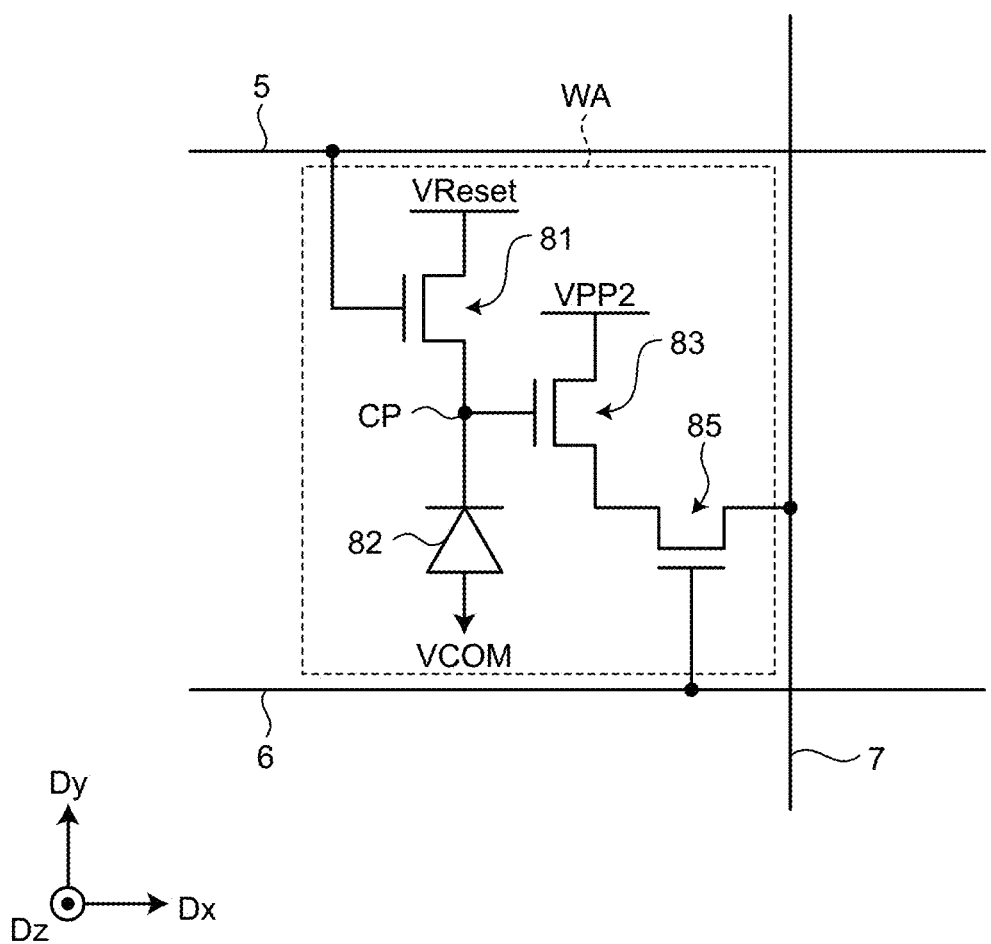
FIG. 3 is a circuit diagram illustrating a circuit configuration of a sensor.

FIG. 3 is a circuit diagram illustrating a circuit configuration of the sensor WA. The first direction Dx and the second direction Dy in FIG. 3 merely correspond to the directions of the reset signal transmission lines 5, the scan lines 6, and the signal lines 7, and do not exactly indicate the relative positional relation of the circuit configuration in the sensor WA.

As illustrated in FIG. 3, a switching element 81, the PD 82, a transistor element 83, and a switching element 85 are provided in the sensor WA. The PD 82 is a photodiode (PD). The switching elements 81 and 85 and the transistor element are metal-oxide semiconductor field-effect transistors (MOSFETs).

The gate of the switching element 81 is coupled to the reset signal transmission line 5. One of the source and the drain of the switching element 81 is given a reset potential VReset. The other of the source and the drain of the switching element 81 is coupled to the cathode of the PD 82 and the gate of transistor element 83. Hereafter, the term "coupling part CP" refers to a point where the other of the source and the drain of the switching element 81 is coupled to the cathode of the PD 82 and the gate of transistor element 83. A reference potential VCOM is given from the anode side of the PD 82. The potential difference between the reset potential VReset and the reference potential VCOM is set in advance, but the reset potential VReset and the reference potential VCOM may be variable. The reset potential VReset is higher than the reference potential VCOM.

The drain of the transistor element 83 serving as a source follower is given an output source potential VPP2. The source of the transistor element 83 is coupled to one of the source and the drain of the switching element 85. The other of the source and the drain of the switching element 85 is coupled to the signal line 7. The gate of the switching element 85 is coupled to the scan line 6.

The reset potential VReset, the reference potential VCOM, and the output source potential VPP2 are supplied by the detection circuit 15 to the sensor WA based on, for example, electric power supplied via a power supply circuit (not illustrated) coupled to the detection circuit 15, but are not limited to being supplied in this way, and may be supplied in a different way as appropriate.

The output source potential VPP2 is set in advance. The potential of the source of the transistor element 83 is lower than the output potential of the PD 82 by a voltage (Vth) between the gate and the source of the transistor element 83. In this case, the potential of the source of the transistor element 83 depends on the reset potential VReset and the reference potential VCOM. The potential of the output of the PD 82 depends on the photovoltaic power generated by the PD 82 corresponding to the light detected by the PD 82 during an exposure period EX to be described later.

When the gate of the switching element 85 is turned on by a signal given from the scan circuit 14 via the scan line 6, the source and the drain of the switching element 85 are coupled to each other. This operation transmits, to the signal line 7 via the switching element 85, a signal (potential) transmitted via the transistor element 83 to the switching element 85. Thus, the output from the sensor WA is generated. Hereafter, the term "scan signal" refers to the signal (potential) given from the scan circuit 14 via the scan line 6. The scan circuit 14 is a circuit that outputs the scan signal.

The output of one PD 82 provided in one sensor WA corresponds to the intensity of the light detected by the PD 82 during the exposure period set in advance. The output of the PD 82 is reset in response to a signal given by the reset circuit 13 via the reset signal transmission line 5. When the signal turns on the gate of the switching element 81, the source and the drain of the switching element 81 are coupled to each other. This operation resets the potential of the coupling part CP to the reset potential VReset.

Figure 4:
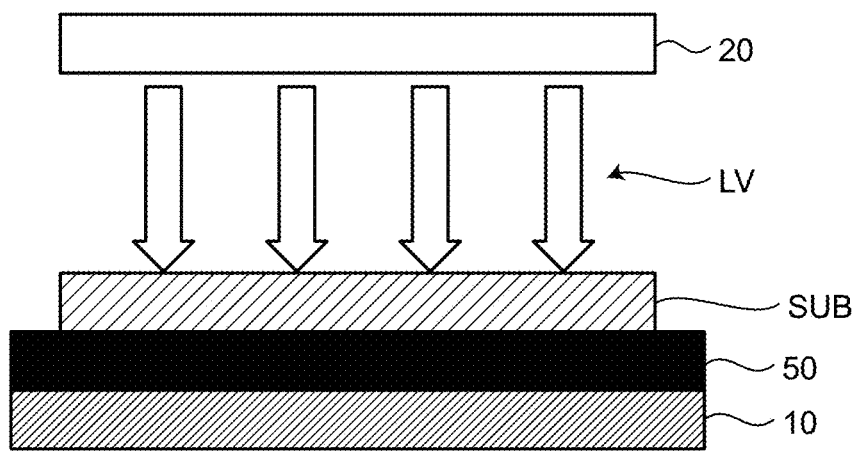
FIG. 4 is a schematic view illustrating a state of the detection system in operation.

The following describes a state of the detection system 1 in operation with reference to FIG. 4.

FIG. 4 is a schematic view illustrating the state of the detection system 1 in operation. In the detection system 1, the light source panel 20 and the sensor panel 10 are provided so as to face each other in the third direction Dz with an object to be detected SUB interposed therebetween. The object to be detected SUB is a Petri dish in which a culture medium such as an agar medium is formed, but is not limited to thereto, and may have other components that transmit the light from the light source panel 20.

In the embodiment, an irradiation limiting member 50 is interposed between the object to be detected SUB and the sensor panel 10. The irradiation limiting member 50 is a member that limits the path of part of light LV that is emitted from the light source panel 20 toward the sensor panel 10 and can reach the sensor panel 10. Specifically, the irradiation limiting member 50 is, for example, a plate-like member dotted with a plurality of through-holes passing therethrough in the third direction Dz. The light that can pass through the irradiation limiting member 50 is limited to the light that passes through the through-holes. The arrangement of the through-holes corresponds to the arrangement of the light sources 22 provided on the sensor panel 10. The through-holes are provided so that each of the PDs 82 does not simultaneously detect light from two or more of the light sources 22. That is, in the embodiment, the light detected by one PD 82 is light from one light source 22. The through-holes are not provided individually corresponding one-to-one to the PDs 82 but each of the through-holes is shared by more than one of the PDs 82. Therefore, the light from one light source 22 is detected by more than one of the PDs 82. The light LV is light R1, light G1, or light B1, which is to be described later.

The object to be detected SUB is placed on the irradiation limiting member 50 and in the detection area SA. The light source panel 20 emits light from above the object to be detected SUB toward the sensor panel 10 by turning on the light sources 22. Of the light emitted from the light sources 22 toward the object to be detected SUB, light that has passed through the object to be detected SUB and the irradiation limiting member 50 is detected by the PDs 82 (refer to FIGS. 3 and 4) in the detection area SA. Hereafter, the term "sensor scan" refers to a process in which the sensor panel 10 detects the light from the light source panel 20 when a positional relation between the light source panel 20, an object to be detected (such as the object to be detected SUB), the irradiation limiting member 50, and the sensor panel 10 is established as illustrated in FIG. 4.

In the embodiment, when the object to be detected SUB is interposed between the sensor panel 10 and the light source panel 20, the irradiation limiting member 50 is further interposed between the object to be detected SUB and the sensor panel 10, but the irradiation limiting member 50 is not an essential component. Another optical member that functions in the same way as the irradiation limiting member 50 may be employed, or the irradiation limiting member 50 may be excluded.

The sensor scan is performed by detecting the light from the light sources 22 using the PDs 82 under the setting conditions described with reference to FIG. 4. Hereafter, the term "sensor scan" refers to the process in which the sensor panel 10 detects the light emitted from the light source panel 20.

Figure 5:
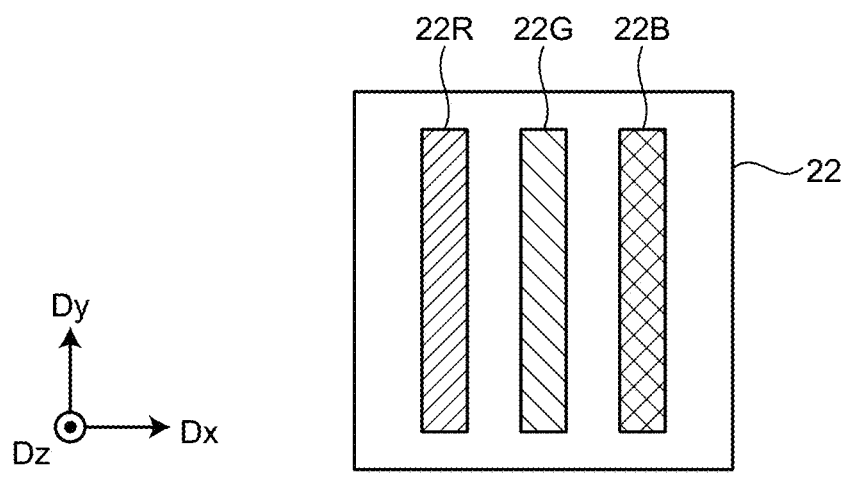
FIG. 5 is a schematic view illustrating a configuration example of a light source.

FIG. 5 is a schematic view illustrating a configuration example of the light source 22. As illustrated in FIG. 5, the light source 22 includes a first light source 22R, a second light source 22G, and a third light source 22B. The first light source 22R, the second light source 22G, and the third light source 22B are light-emitting elements (such as LEDs) that emit light in different colors. In the embodiment, the first light source 22R emits light in red (R). The second light source 22G emits light in green (G). The third light source 22B emits light in blue (B).

The light source 22 illustrated in FIG. 5 has a configuration in which the longitudinal directions of the first light source 22R, the second light source 22G, and the third light source 22B are along the second direction Dy, and the first light source 22R, second light source 22G, and third light source 22B are arranged in this order from one side toward the other side in the first direction Dx. This configuration is, however, an exemplary form of the light source 22, which is not limited to having this form. The shape in plan view of the first light source 22R, the second light source 22G, and the third light source 22B in the light source 22 and the positional relation between the first light source 22R, the second light source 22G, and the third light source 22B can be changed as appropriate.

Figure 6:
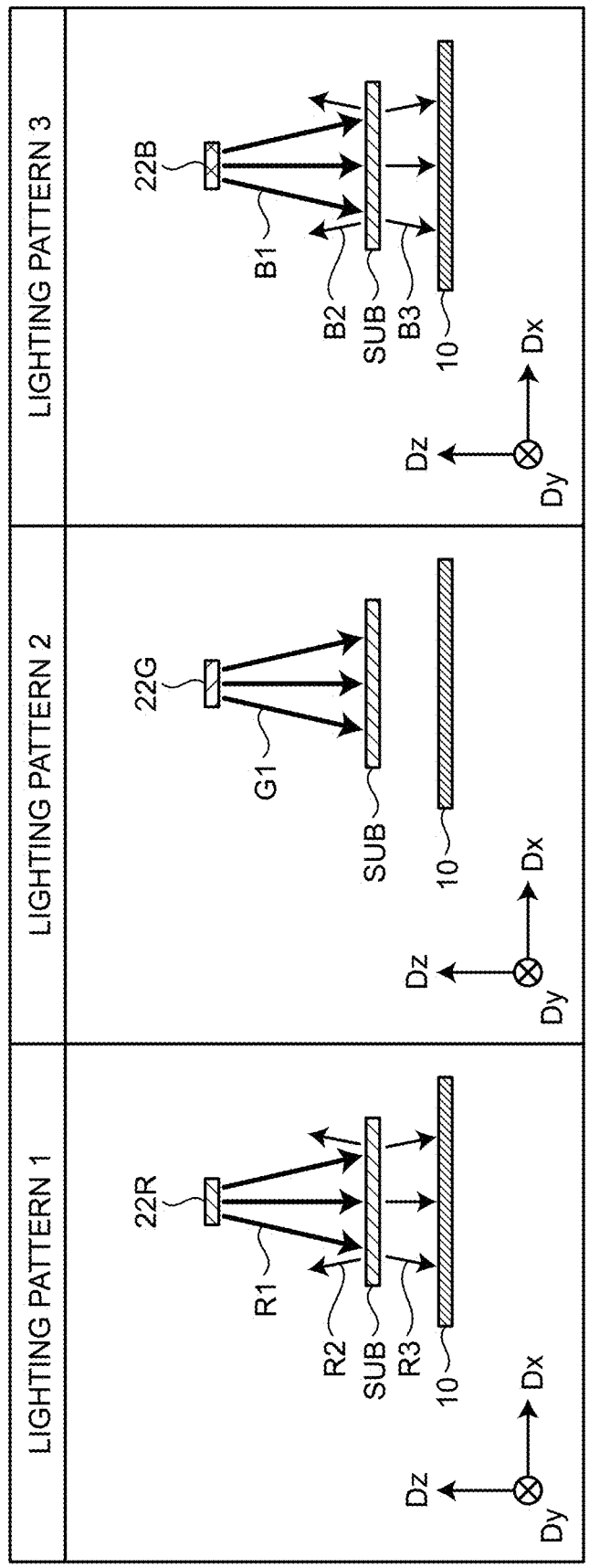
FIG. 6 illustrates schematic views illustrating lighting patterns of the light source in a sensor scan.

FIG. 6 illustrates schematic views illustrating the lighting patterns of the light source 22 in the sensor scan. When the object to be detected SUB is located between the sensor panel 10 and the light source panel 20 as described with reference to FIG. 4, light out of the light from the first light source 22R, the second light source 22G, and the third light source 22B that reaches the sensor panel 10 depends on the color of the object to be detected SUB.

For example, assume a case where the object to be detected SUB is a culture medium tinged with purple by culturing of microorganisms. In this case, as illustrated in "Lighting Pattern 1" in FIG. 6, part of the light R1 emitted from the first light source 22R toward the object to be detected SUB is reflected by the object to be detected SUB and scattered as light R2. Part of the light R1 is directed as light R3 toward the opposite side to the first light source 22R with the object to be detected SUB interposed therebetween and reaches the sensor panel 10. In this case, as illustrated in "Lighting Pattern 3", part of the light B1 emitted from the third light source 22B toward the object to be detected SUB is reflected by the object to be detected SUB and scattered as light B2. Part of the light B1 is directed as light B3 toward the opposite side to the third light source 22B with the object to be detected SUB interposed therebetween and reaches the sensor panel 10. In contrast, in this case, as illustrated in "Lighting Pattern 2", the light G1 emitted from the second light source 22G toward the object to be detected SUB is mostly absorbed by the object to be detected SUB because the object to be detected SUB is a purple-colored object, and substantially does not reach the sensor panel 10. Thus, the light out of the light from the first light source 22R, the second light source 22G, and the third light source 22B that reaches the sensor panel 10 depends on the color of the object to be detected SUB.

In the embodiment, the PD 82 of the sensor WA detects the level of intensity of light and does not identify the color of light. Therefore, in the embodiment, a period when each of the first light sources 22R is turned on as illustrated in "Lighting Pattern 1" in FIG. 6, a period when each of the second light sources 22G is turned on as illustrated in "Lighting Pattern 2", and a period when each of the third light sources 22B is turned on as illustrated in "Lighting Pattern 3", for example, are individually provided, whereby detection results of the light according to the color of the object to be detected SUB are obtained. That is, in the embodiment, the sensor scan is performed for each of "Lighting Pattern 1", "Lighting Pattern 2", and "Lighting Pattern 3". The results of these sensor scans are then integrated to obtain an output of the sensor scans including color information according to the color of the object to be detected SUB. Hereafter, the term "data integration" refers to the integration of the results of such sensor scans for obtaining the output of the sensor scans that includes the color information according to the color of the object to be detected SUB. The data integration reflects adjustment coefficients of signal strengths to be described later.

In the example illustrated in FIG. 6, light reaching the sensor panel 10 is generated in "Lighting Pattern 1" and "Lighting Pattern 3" and light reaching the sensor panel 10 is not generated in "Lighting Pattern 2". However, this example is merely exemplary and does not indicate that this always occurs in "Lighting Pattern 1", "Lighting Pattern 2", and "Lighting Pattern 3".

Assuming that a first output is an output of the sensor WA corresponding to a period when light in a first color (such as red (R)) is emitted, "Lighting Pattern 1" illustrated in FIG. 6 indicates a lighting pattern of each light source 22 from which the first output is obtained. Assuming that a second output is an output of the sensor WA corresponding to a period when light in a second color (such as green (G)) is emitted, "Lighting Pattern 2" illustrated in FIG. 6 indicates a lighting pattern of each light source 22 from which the second output is obtained. Assuming that a third output is an output of the sensor WA corresponding to a period when light in a third color (such as blue (B)) is emitted, "Lighting Pattern 3" illustrated in FIG. 6 indicates a lighting pattern of each light source 22 from which the third output is obtained.

As described with reference to FIG. 1, a plurality of the light sources 22 are arranged in the light-emitting area LA. As described with reference to FIG. 5, the light source 22 includes the first light source 22R, the second light source 22G, and the third light source 22B. Therefore, in the embodiment, a plurality of the first light sources 22R, a plurality of the second light sources 22G, and a plurality of the third light source 22B are provided. The first light sources 22R, the second light sources 22G, and the third light sources 22B of the light sources 22 are not necessarily uniform in luminance. The first light sources 22R, the second light sources 22G, and the third light sources 22B may differ in luminance between one another due to individual differences as light-emitting elements.

Figure 7:
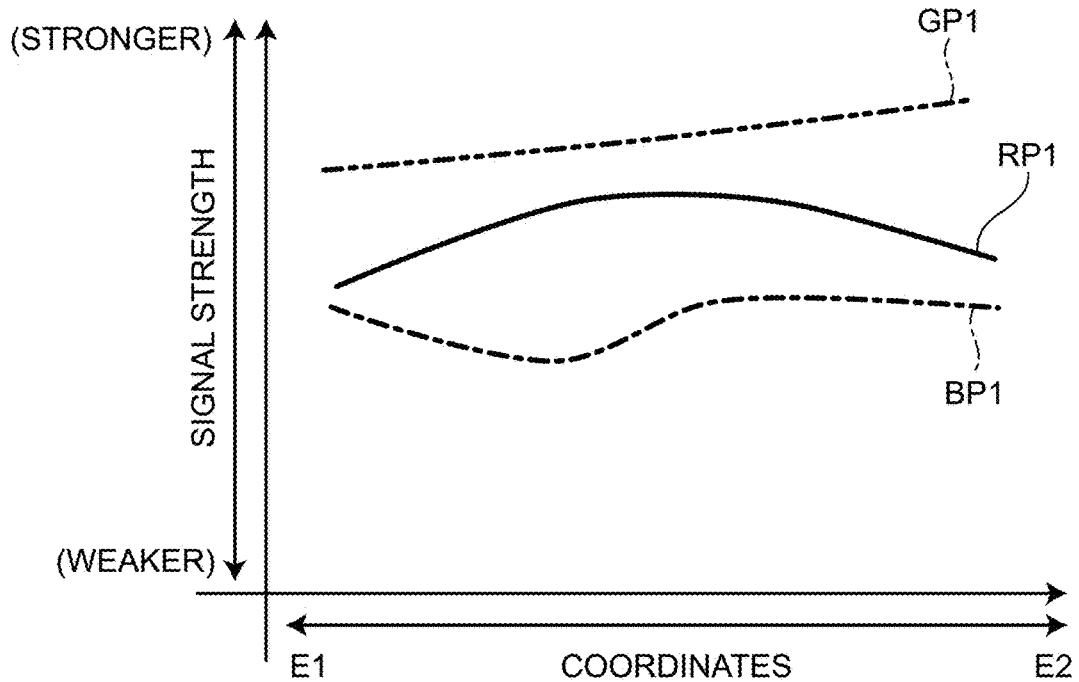
FIG. 7 is a graph illustrating an example when luminance distributions of first light sources, second light sources, and third light sources differ from one another.

FIG. 7 is a graph illustrating an example when luminance distributions of the first light sources 22R, the second light sources 22G, and the third light sources 22B differ from one another. Of coordinates of the detection area SA indicated by the horizontal axis of each of graphs illustrated in FIGS. 7 to 9, "E1" indicates one end of the detection area SA along one of the first direction Dx and the second direction Dy. "E2" indicates the other end of the detection area SA along one of the first direction Dx and the second direction Dy. The signal strength indicated by the vertical axis of the graphs illustrated in each of FIGS. 7 to 9 represents the degree of strength of each of the signals output according to the luminance of the light detected by the sensors WA provided at the respective coordinates.

Graph RP1 illustrated in FIG. 7 illustrates an example of the luminance distribution of the light from the first light sources 22R detected within the area from "E1" to "E2". Graph GP1 illustrates an example of the luminance distribution of the light from the second light sources 22G detected within the area from "E1" to "E2". Graph BP1 illustrates an example of the luminance distribution of the light from the third light sources 22B detected within the area from "E1" to "E2". In the following description, a case will be assumed where Graph RP1, Graph GP1, and Graph BP1 are obtained in the embodiment. Naturally, the actual luminance distributions of the first light sources 22R, the second light sources 22G, and the third light sources 22B are not limited to Graph RP1, Graph GP1, and Graph BP1.

When the luminance of each color varies on coordinates as illustrated in Graph RP1, Graph GP1, and Graph BP1, the output of the sensor scan reflects coloring caused by the variation in luminance, instead of the color of the object to be detected SUB. For this reason, the variation in luminance affects the accuracy of color reproduction in the output of the sensor scan. Therefore, in the embodiment, the signal strengths are adjusted so that the luminance of the light from the first light source 22R, the luminance of the light from the second light source 22G, and the luminance of the light from the third light source 22B can be regarded as substantially identical in units of at least coordinates.

Figure 8:
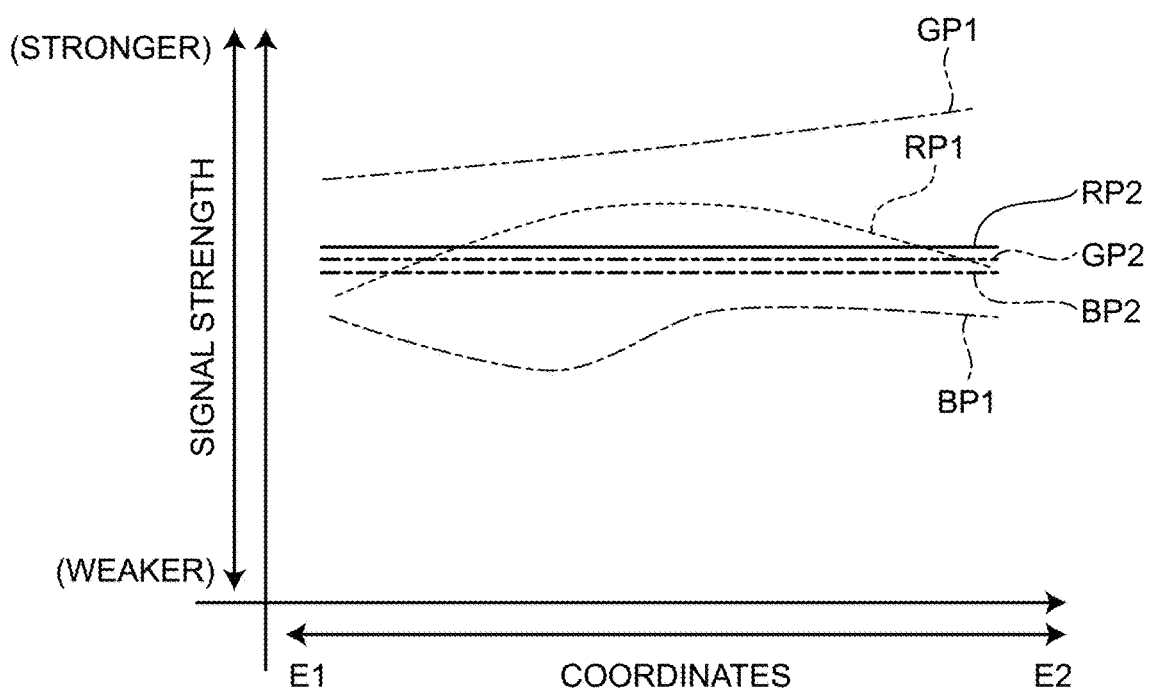
FIG. 8 is a graph illustrating an example of adjustment of signal strength.
Figure 9:
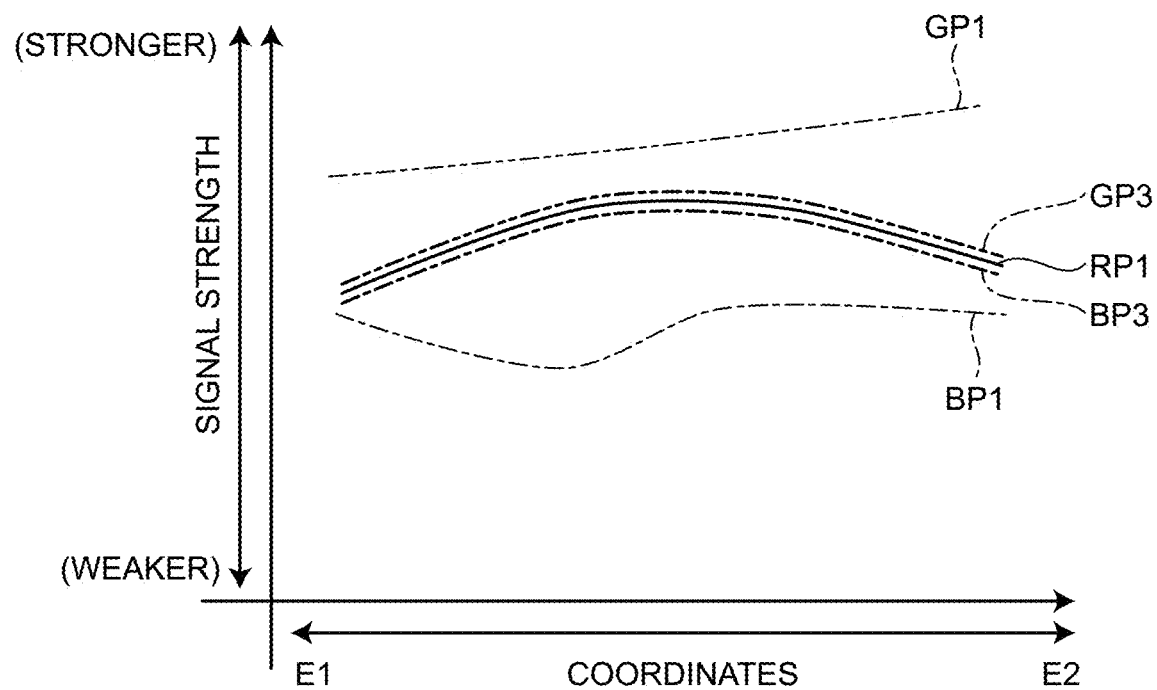
FIG. 9 is a graph illustrating another example of the adjustment of the signal strength.

FIG. 8 is a graph illustrating an example of the adjustment of the signal strength. In the example illustrated in FIG. 8, the outputs are adjusted so that the outputs of the sensors WA at the respective coordinates provided in the detection area SA are regarded as a fixed output value. Therefore, the signal strengths are made constant regardless of the coordinates, as illustrated by Graph RP2, Graph GP2, and Graph BP2 illustrated in FIG. 8.

Graph RP2 illustrated in FIG. 8 illustrates adjusted signal strengths corresponding to Graph RP1 that is the luminance distribution of the light from the first light sources 22R. Graph GP2 illustrates adjusted signal strengths corresponding to Graph GP1 that is the luminance distribution of the light from the second light sources 22G. Graph BP2 illustrates adjusted signal strengths corresponding to Graph BP1 that is the luminance distribution of the light from the third light sources 22B.

If no adjustment is made, the distributions of the signal strengths output by the sensors WA at the respective coordinates provided within the area from "E1" to "E2" reflect Graph RP1, Graph GP1, and Graph BP1 as they are. At the coordinates where the value of Graph RP1 lower than that of Graph RP2 serving as a predetermined signal strength is obtained, an adjustment is made to increase the signal strength to that of Graph RP2. At the coordinates where the value of Graph RP1 higher than that of Graph RP2 is obtained, an adjustment is made to reduce the signal strength to that of Graph RP2. As a result, the output of the sensor scan having the signal strength of Graph RP2 can be obtained regardless of the coordinates. By reflecting the above-described adjustment according to the relation between Graph RP1 and Graph RP2 also in the relation between Graph GP1 and Graph GP2 and the relation between Graph BP1 and Graph BP2, the outputs of the sensor scans having the signal strengths on Graph GP2 and Graph BP2 can be obtained.

In FIG. 8, Graph RP2 appears to be higher than Graph GP2 and Graph BP2, and Graph GP2 appears to be higher than Graph BP2, but, in fact, these graphs are all the same. FIG. 8 illustrates Graph RP2, Graph GP2, and Graph BP2 with different lines only for explanatory convenience. The relation between Graph RP1, Graph GP3, and Graph BP3 illustrated in FIG. 9 to be explained later is the same as the relation between Graph RP2, Graph GP2, and Graph BP2.

The signal strength defined as each of Graph RP2, Graph GP2, and Graph BP2 may be a fixed signal strength or a signal strength corresponding to the average value of one of Graph RP1, Graph GP1, and Graph BP1 (for example, Graph RP1). Making the signal strengths correspond to the average value can reduce the degree of adjustment.

Assume that Raw is the output before adjustment from the sensor WA located at certain coordinates (x, y) in the Dx-Dy plane of the detection area SA. Assume that Raw (R) is a component of the output Raw corresponding to the detection result of the light from the first light source 22R. Assume that Raw (G) is a component of the output Raw corresponding to the detection result of the light from the second light source 22G. Assume that Raw (B) is a component of the output Raw corresponding to the detection result of the light from the third light source 22B. Assume that Co is an adjustment coefficient applied to the output from the sensor WA located at the coordinates (x, y). Assume that Co(R) is a component of the adjustment coefficient Co applied to the output component corresponding to the detection result of the light from the first light source 22R. Assume that Co(G) is a component of the adjustment coefficient Co applied to the output component corresponding to the detection result of the light from the second light source 22G. Assume that Co(B) is a component of the adjustment coefficient Co applied to the output component corresponding to the detection result of the light from the third light source 22B. When Ave denotes the average value of one of Graph RP1, Graph GP1, and Graph BP1 (for example, Graph RP1), Co(R) can be expressed as Expression (1) below, Co(G) as Expression (2) below, and Co(B) as Expression (3) below. In the adjustment of the signal strength using the adjustment coefficients, Co(R) is applied to the first output mentioned above, Co(G) is applied to the second output mentioned above, and Co(B) is applied to the third output mentioned above. In the adjustment corresponding to the description with reference to FIG. 8, Co(R), Co(G), and Co(B) are calculated individually for each of the sensors WA.

$$Co(R) = \text{Ave}/\text{Raw}(R) \quad (1)$$

$$Co(G) = \text{Ave}/\text{Raw}(G) \quad (2)$$

$$Co(B) = \text{Ave}/\text{Raw}(B) \quad (3)$$

The method for adjusting the signal strength is not limited to that described with reference to FIG. 8.

FIG. 9 is a graph illustrating another example of the adjustment of the signal strength. Graph GP3 illustrated in FIG. 9 indicates the adjusted signal strengths obtained by adjusting Graph GP1 so as to correspond to Graph RP1. Graph BP3 indicates the adjusted signal strengths obtained by adjusting Graph BP1 so as to correspond to Graph RP1. In FIG. 9, Graph GP3 appears to be higher than Graph RP1 and Graph BP3, and Graph RP1 appears to be higher than Graph BP3, but, in fact, these graphs are all the same.

In the example illustrated in FIG. 9, the adjustment is made to make the signal strengths obtained when the light from the light sources of the other colors (second light sources 22G and third light sources 22B) is detected match with the signal strengths corresponding to the luminance of the first light sources 22R detected by the sensors WA at the respective coordinates. Therefore, the states of the distributions of the signal strengths indicated by Graph GP3 and Graph BP3 within the area from "E1" to "E2" are the same as the state of the luminance distribution indicated by Graph RP1 within that area, wherein Graph GP3 indicates the adjusted signal strengths obtained by adjusting Graph GP1, and Graph BP3 indicates the adjusted signal strengths obtained by adjusting Graph BP1.

In the case of the description with reference to FIG. 9, Co(R) can be expressed as Expression (4) below, Co(G) as Expression (5) below, and Co(B) as Expression (6) below.

$$Co(R) = \text{Raw}(R)/\text{Raw}(R) \quad (4)$$

$$Co(G) = \text{Raw}(R)/\text{Raw}(G) \quad (5)$$

$$Co(B) = \text{Raw}(R)/\text{Raw}(B) \quad (6)$$

Since Co(R) in Expression (4) is always 1, the adjustment corresponding to the description with reference to FIG. 9 does not adjust the output corresponding to the detection result of the light from the first light source 22R in the same manner as the first output described above. Therefore, the adjustment corresponding to the description with reference to FIG. 9 adjusts the output corresponding to the detection result of the light from the second light source 22G and the output corresponding to the detection result of the light from the third light source 22B in the same manner as the second output and the third output described above. Thus, in the adjustment corresponding to the description with reference to FIG. 9, Co(G) and Co(B) only need to be calculated individually for each of the sensors WA.

In the embodiment, the adjustment of the signal strength described with reference to FIGS. 8 and 9 is performed. The sensor scan for the adjustment of the signal strength is performed without interposing the object to be detected SUB between the sensor panel 10 and the light source panel 20.

Figure 10:
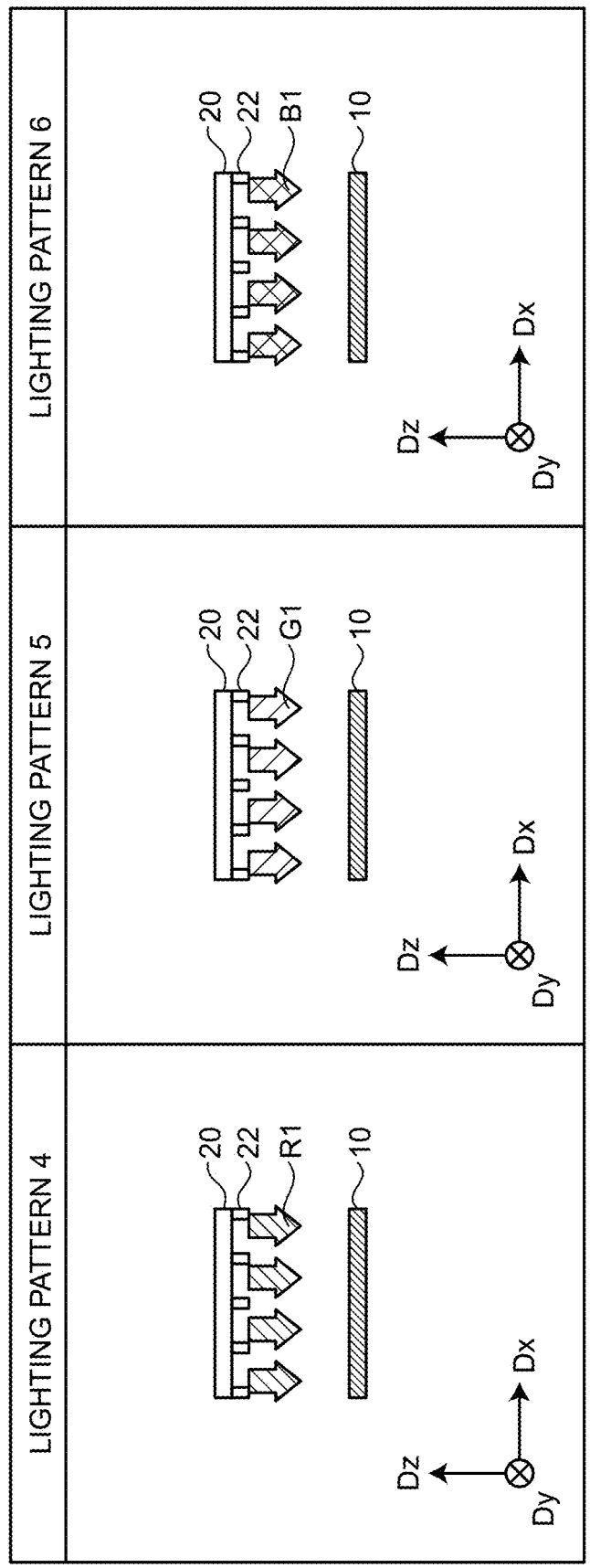
FIG. 10 illustrates schematic views illustrating lighting patterns of the light source in the sensor scan for the adjustment of the signal strength.

FIG. 10 illustrates schematic views illustrating the lighting patterns of the light source 22 in the sensor scan for the adjustment of the signal strength. In the embodiment, a period when each first light source 22R is turned on to irradiate the light source panel 20 with the light R1 as illustrated in "Lighting Pattern 4" in FIG. 10, a period when each second light source 22G is turned on to irradiate the light source panel 20 with the light G1 as illustrated in "Lighting Pattern 5", and a period when each third light source 22B is turned on to irradiate the light source panel 20 with the light B1 as illustrated in "Lighting Pattern 6" are individually provided. To describe this in terms of correspondence to Graph RP1, Graph GP1, and Graph BP1 illustrated in FIGS. 7 to 9, Graph RP1 is obtained using "Lighting Pattern 4", Graph GP1 is obtained using "Lighting Pattern 5", and Graph BP1 is obtained using "Lighting Pattern 6".

As illustrated in FIG. 10, in "Lighting Pattern 4", "Lighting Pattern 5", and "Lighting Pattern 6", the object to be detected SUB is not interposed between the sensor panel 10 and the light source panel 20. Therefore, the sensors WA provided on the sensor panel 10 detect the light R1 emitted from the first light sources 22R in "Lighting Pattern 4", detect the light G1 emitted from the second light sources 22G in "Lighting Pattern 5", and detect the light B1 emitted from the third light sources 22B in "Lighting Pattern 6". The adjustment coefficients of the signal strengths are determined according to the outputs of the sensor scans obtained in this way, and thereby, the adjusted outputs of the sensor scans corresponding to the distributions of the signal strengths corresponding to Graph RP2, Graph GP2, and Graph BP2 or Graph RP1, Graph GP3, and Graph BP3 can be obtained.

Assuming that a fourth output is an output obtained when the light in the first color (such as red (R)) is emitted directly from the light source (for example, the first light source 22R) to the sensor WA, "Lighting Pattern 4" illustrated in FIG. 10 indicates the lighting pattern of the light source 22 from which the fourth output is obtained. Assuming that a fifth output is an output obtained when the light in the second color (such as green (G)) is emitted directly from the light source (for example, the second light source 22G) to the sensor WA, "Lighting Pattern 5" illustrated in FIG. 10 indicates the lighting pattern of the light source 22 from which the fifth output is obtained. Assuming that a sixth output is an output obtained when the light in the third color (such as blue (B)) is emitted directly from the light source (for example, the third light source 22B) to the sensor WA, "Lighting Pattern 6" illustrated in FIG. 10 indicates the lighting pattern of the light source 22 from which the sixth output is obtained. As expressed by Expressions (1), (2), and (3) given above, the adjustment coefficients described with reference to FIG. 8 correspond to the average value (AVE) of the outputs of a plurality of the sensors WA. As expressed by Expressions (4), (5), and (6) given above, the adjustment coefficients described with reference to FIG. 9 correspond to the luminance distribution of the light in the first color in the detection area SA (Graph RP1) when the fourth output is obtained.

Since the irradiation limiting member 50 only limits the path of the light and does not change the light itself that can reach the sensor panel 10 from the light source panel 20, the light reaching the sensor panel 10 from the light source panel 20 can be said to be the light directly emitted from the light source 22 to the sensor WA even when the irradiation limiting member 50 is provided.

In the embodiment, the output of the sensor scan with the object to be detected SUB interposed between the sensor panel 10 and the light source panel 20 as illustrated in FIGS. 4 and 6 is the adjusted output of the sensor scan. That is, the output of the sensor scan with the object to be detected SUB interposed between the sensor panel 10 and the light source panel 20 reflects the adjustment of the signal strength.

In the sensor scan for the adjustment of the signal strength and the sensor scan with the object to be detected SUB interposed between the sensor panel 10 and the light source panel 20, the period when the first light source 22R is turned on, the period when the second light source 22G is turned on, and the period when the third light source 22B is turned on are individually provided.

Figure 11:
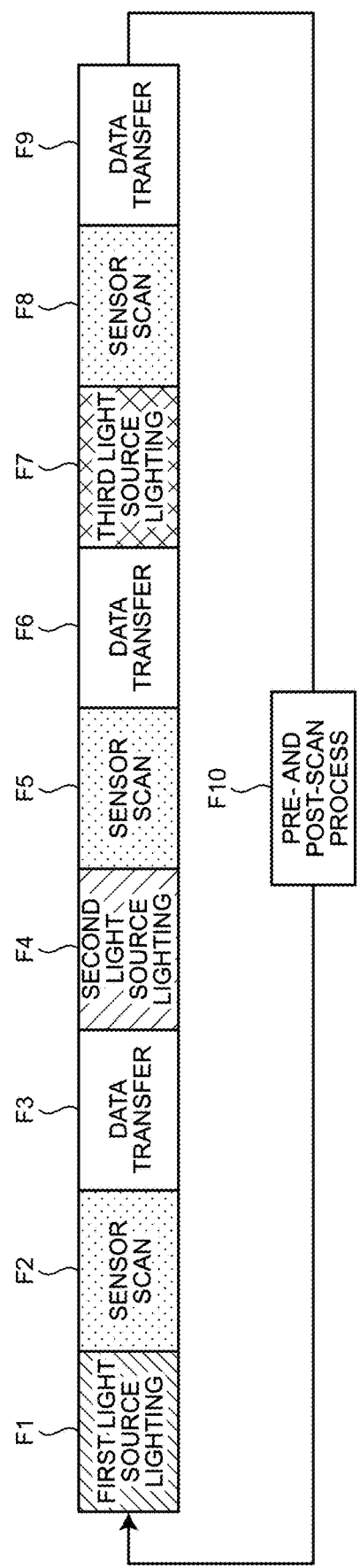
FIG. 11 is a chart illustrating exemplary lighting control of the first light source, the second light source, and the third light source in the sensor scan.

FIG. 11 is a chart illustrating exemplary lighting control of the first light source 22R, the second light source 22G, and the third light source 22B in the sensor scan. As illustrated in FIG. 11, first, first light source lighting (phase F1), that is, the period when each of the first light sources 22R is turned on is provided. Then, the output of sensor scan (phase F2) is performed. In the output of the sensor scan, the signal strength reflects the luminance of the light from the first light source 22R detected by the sensor WA during the period of the first light source lighting. Then, data transfer (phase F3) is performed. In the data transfer, data reflecting the output of the sensor scan is transferred from the detection circuit 15 to the information processing device 30.

Then, second light source lighting (phase F4), that is, the period when each of the second light sources 22G is turned on is provided. Then, the output of sensor scan (phase F5) is performed. In the output of the sensor scan, the signal strength reflects the luminance of the light from the second light source 22G detected by the sensor WA during the period of the second light source lighting. Then, data transfer (phase F6) is performed. In the data transfer, data reflecting the output of the sensor scan is transferred from the detection circuit 15 to the information processing device 30.

Then, third light source lighting (phase F7), that is, the period when each of the third light sources 22B is turned on is provided. Then, the output of sensor scan (phase F8) is performed. In the output of the sensor scan, the signal strength reflects the luminance of the light from the third light source 22B detected by the sensor WA during the period of the third light source lighting. Then, data transfer (phase F9) is performed. In the data transfer, data reflecting the output of the sensor scan is transferred from the detection circuit 15 to the information processing device 30.

An electric charge corresponding to the degree of detection of the light by the sensor WA is reset each time the sensor scan illustrated in FIG. 11 is performed. When a sequence of sensor scans including the first light source lighting, the second light source lighting, and the third light source lighting, each being performed once, is performed a plurality of times, a pre- and post-scan process (phase F10) is performed between the data transfer after the third light source lighting and the first light source lighting. Examples of the pre- and post-scan process include placement of the object to be detected SUB after the sequence of sensor scans for adjusting the signal strength and replacement of the object to be detected SUB for sensor scans of a plurality of types of the objects to be detected SUB. During the pre- and post-scan process, the detection system 1 is placed in a standby (sleep) state.

For example, the information processing device 30 performs the processing to adjust the signal strengths, integrate the data, and reflect the adjustment coefficients of the signal strengths when integrating the data. The detection circuit 15, however, may have the function to perform the processing to adjust the signal strengths, integrate the data, and reflect the adjustment coefficients of the signal strengths when integrating the data. In that case, the data transfer in FIG. 11 can be excluded. That is, the data transfer from the detection circuit 15 to the information processing device 30 corresponding to the sensor scans can be performed in a consolidated manner after the data is integrated. In addition, the data obtained by the output of the sensor scan performed to adjust the signal strength need not be transferred to the information processing device 30, and the adjustment coefficients of the signal strengths are held by the detection circuit 15.

Of the operations of the detection system 1 in the embodiment described above, the process of the sensor scan for the adjustment of the signal strength and the sensor scan with the object to be detected SUB interposed between the sensor panel 10 and the light source panel 20 will be described with reference to FIGS. 12 to 15. First, the case where the information processing device 30 performs the adjustment of the signal strength and the integration of the data will be described with reference to FIGS. 12 and 13.

Figure 12:
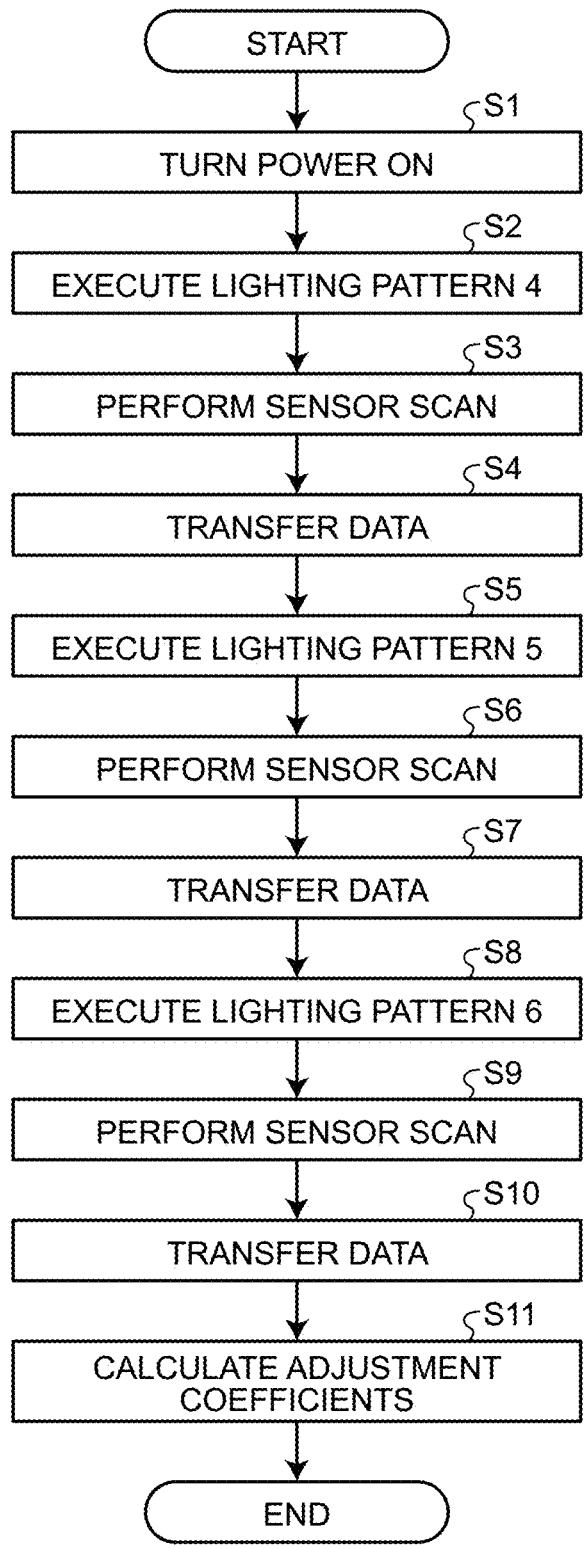
FIG. 12 is a flowchart of processing for the sensor scan for the adjustment of the signal strength.

FIG. 12 is a flowchart of processing for the sensor scan for the adjustment of the signal strength. In this processing, at the time when the power of the detection system 1 is turned on (Step S1), no other object to be externally introduced to the detection system 1, such as the object to be detected SUB, is assumed to be brought to the detection system 1.

First, a lighting control period of the light sources 22 corresponding to "Lighting Pattern 4" (Step S2) illustrated in FIG. 10, that is, a lighting period of the first light sources 22R, is provided. Then, the sensor scan is performed (Step S3) to produce an output of a signal indicating a degree of each strength of light detected during the period of Step S2. Then, data reflecting the output of the sensor scan at Step S3 is transferred from the detection circuit 15 to the information processing device 30 (Step S4).

The lighting control period of the light sources 22 corresponding to "Lighting Pattern 5" (Step S5) illustrated in FIG. 10, that is, a lighting period of the second light sources 22G, is also provided. Then, the sensor scan is performed (Step S6) to produce the output of the signal indicating the degree of each strength of the light detected during the period of Step S5. Then, the data reflecting the output of the sensor scan at Step S6 is transferred from the detection circuit 15 to the information processing device 30 (Step S7).

The lighting control period of the light sources 22 corresponding to "Lighting Pattern 6" (Step S8) illustrated in FIG. 10, that is, a lighting period of the third light sources 22B, is also provided. Then, the sensor scan is performed (Step S9) to produce the output of the signal indicating the degree of the strength of each light detected during the period of Step S8. Then, the data reflecting the output of the sensor scan at Step S9 is transferred from the detection circuit 15 to the information processing device 30 (Step S10).

The information processing device 30 calculates the adjustment coefficients of the signal strengths based on the data transferred by the processes at Steps S4, S7, and S10 (Step S11). For example, if the adjustment coefficients corresponding to the average value (Ave) are calculated as described with reference to FIG. 8, the adjustment coefficients (Co(R), Co(B), and Co(G)) are calculated as expressed in Expressions (1), (2), and (3) given above. If the adjustment coefficients corresponding to Graph RP1 are calculated as described with reference to FIG. 9, the adjustment coefficients (Co(R), Co(B), and Co(G)) are calculated as expressed in Expressions (4), (5), and (6) given above.

Figure 13:
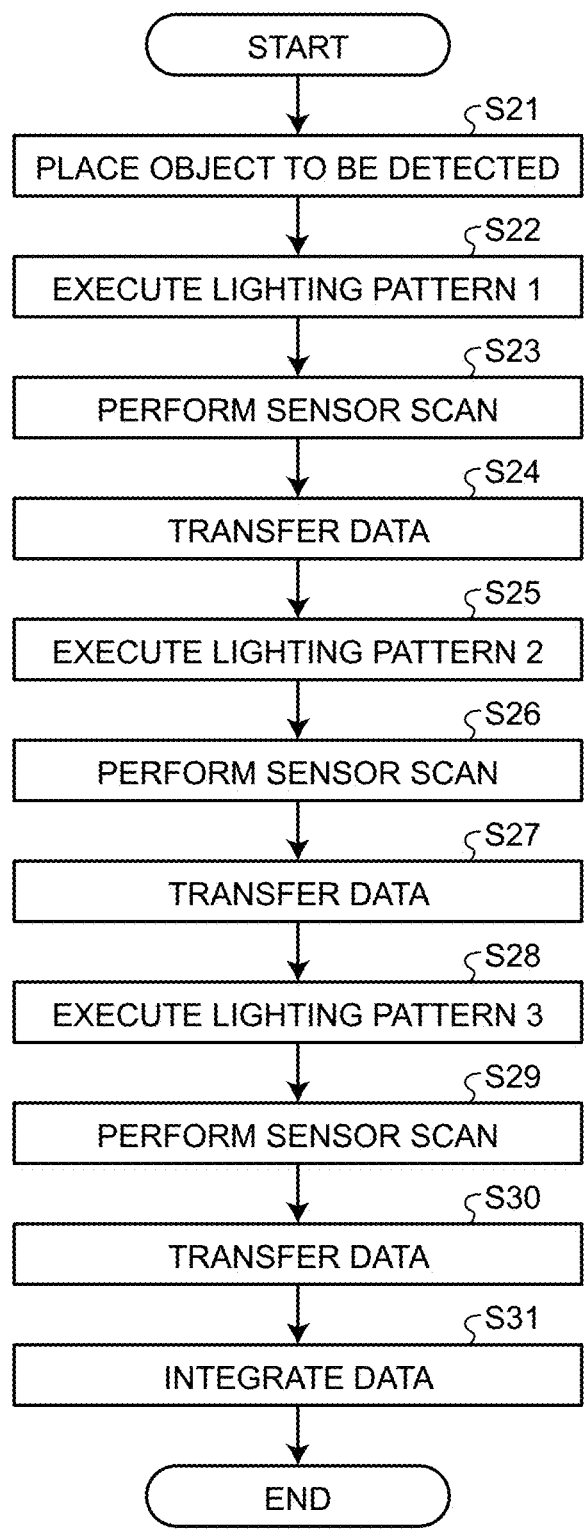
FIG. 13 is a flowchart of processing for the sensor scan of the object to be detected.

FIG. 13 is a flowchart of processing for the sensor scan of the object to be detected SUB. In this process, the object to be detected SUB is first placed between the sensor panel 10 and the light source panel 20 (step S21).

Then, the lighting control period of the light sources 22 corresponding to "Lighting Pattern 1" (Step S22) illustrated in FIG. 6, that is, the lighting period of the first light sources 22R, is provided. Then, the sensor scan is performed (Step S23) to produce the output of each of the signals indicating the degrees of strengths of the light detected during the period of Step S22. Then, the data reflecting the output of the sensor scan at Step S23 is transferred from the detection circuit 15 to the information processing device 30 (Step S24).

The lighting control period of the light sources 22 corresponding to "Lighting Pattern 2" (Step S25) illustrated in FIG. 6, that is, the lighting period of the second light sources 22G, is also provided. Then, the sensor scan is performed (Step S26) to produce the output of each of the signals indicating the degrees of strengths of the light detected during the period of Step S25. Then, the data reflecting the output of the sensor scan at Step S26 is transferred from the detection circuit 15 to the information processing device 30 (Step S27).

The lighting control period of the light sources 22 corresponding to "Lighting Pattern 3" (Step S28) illustrated in FIG. 6, that is, the lighting period of the third light sources 22B, is also provided. Then, the sensor scan is performed (Step S29) to produce the output of each of the signals indicating the degrees of strengths of the light detected during the period of Step S28. Then, the data reflecting the output of the sensor scan at Step S29 is transferred from the detection circuit 15 to the information processing device 30 (Step S30).

The information processing device 30 integrates the data transferred by the processes at Steps S24, S27, and S30 (Step S31). The process at Step S31 reflects the adjustment coefficients of the signal strengths calculated by the process at Step S11. Specifically, in the output of the sensor scan obtained by the process at Step S23, Co(R) individually calculated for each of the sensors WA is individually applied to the output of the sensor WA. If the adjustment coefficients corresponding to Graph RP1 are calculated as described with reference to FIG. 9, the adjustment by the application of Co(R) is not performed. In the output of the sensor scan obtained by the process at Step S26, Co(G) individually calculated for each of the sensors WA is individually applied to the output of the sensor WA. In the output of the sensor scan obtained by the process at Step S29, Co(B) individually calculated for each of the sensors WA is individually applied to the output of the sensor WA. As a result, data is obtained that indicates the output of the sensor scan reflecting the color of the object to be detected SUB and is less affected by the variations in luminance of the first light sources 22R, the second light sources 22G, and the third light sources 22B.

Figure 14:
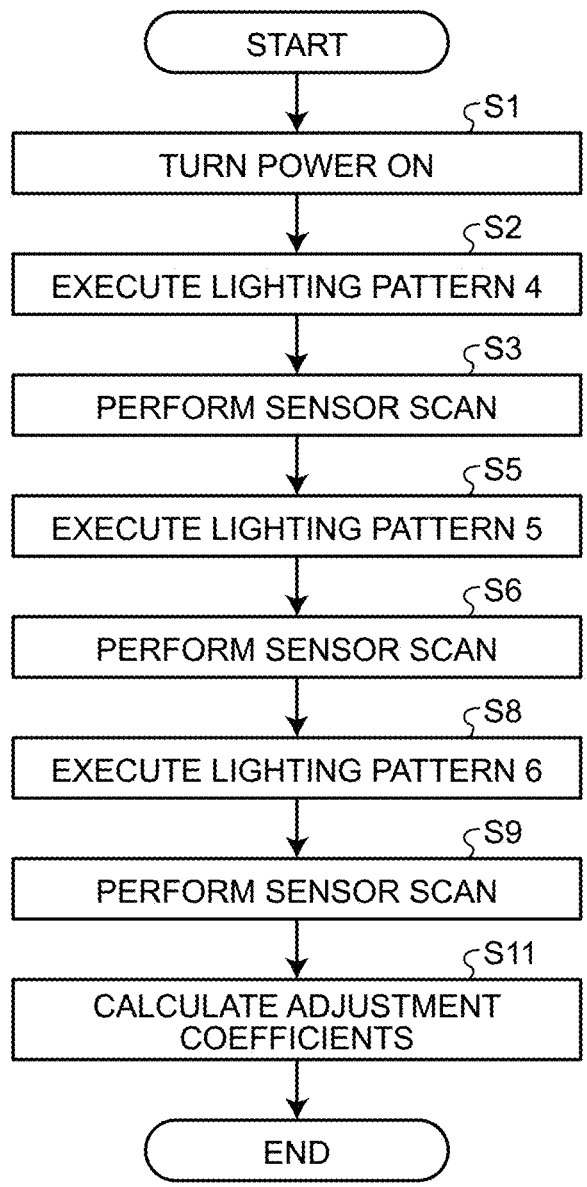
FIG. 14 is a flowchart of processing for the sensor scan for the adjustment of the signal strength.
Figure 15:
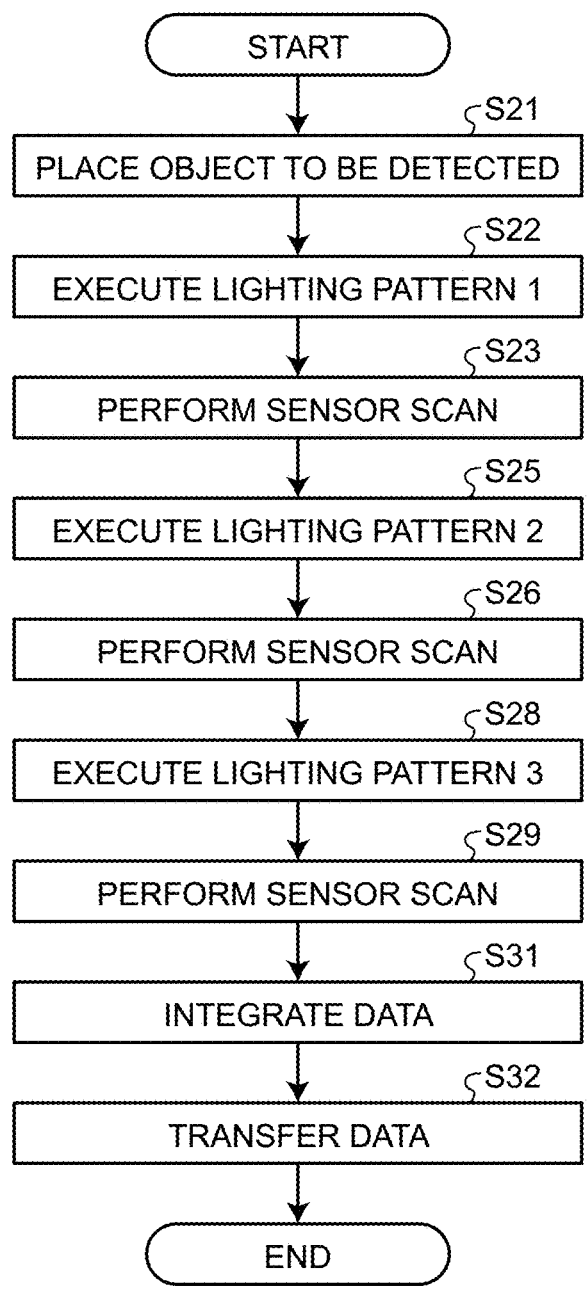
FIG. 15 is a flowchart of processing for the sensor scan of the object to be detected.

The following describes the case where the detection circuit 15 performs the adjustment of the signal strength and the integration of the data, with reference to FIGS. 14 and 15. In the description with reference to FIGS. 14 and 15, differences from the description with reference to FIGS. 12 and 13 will be specially noted.

FIG. 14 is a flowchart of processing for the sensor scan for the adjustment of the signal strength. When the detection circuit 15 performs the adjustment of the signal strength, the same processing as that described with reference to FIG. 12 is performed, except that the processes at Steps S4, S7, and S10 described with reference to FIG. 12 are not performed and the process at Step S11 is performed by the detection circuit 15 instead of by the information processing device 30. Thus, in this case, as illustrated in FIG. 14, the processes are performed in the order of Steps S1, S2, S3, S5, S6, S8, S9, and S11.

FIG. 15 is a flowchart of processing for the sensor scan of the object to be detected SUB. When the detection circuit 15 performs the integration of the data, the same processing as that described with reference to FIG. 12 is performed, except that the processes at Steps S24, S27, and S30 described with reference to FIG. 13 are not performed, the process at Step S31 is performed by the detection circuit 15 instead of by the information processing device 30, and the process at Step S32 is added. Thus, in this case, as illustrated in FIG. 15, the processes are performed in the order of Steps S21, S22, S23, S25, S26, S28, S29, S31, and S32.

In the process at Step S32, the data obtained by the process at Step S31 is transferred from the detection circuit 15 to the information processing device 30. That is, the data indicating the output of the sensor scan reflecting the color of the object to be detected SUB is transferred from the detection circuit 15 to the information processing device 30.

As described above, according to the embodiment, the detection apparatus (for example, the detection apparatus 60) includes the sensor (for example, the sensor WA) that includes the photodiode (PD 82) to detect light and produces the output corresponding to the degree of the detected light, the detection circuit 15 that acquires the output of the sensor, and the light source (for example, the light source 22) that switchably emits the light in the first color (such as red (R)), the light in the second color (such as green (G)), and the light in the third color (such as blue (B)).

In the embodiment, the detection circuit 15 individually acquires the first output, the second output, and the third output. The first output is the output of the sensor corresponding to the period when the light in the first color (such as red (R)) is emitted. The second output is the output of the sensor corresponding to the period when the light in the second color (such as green (G)) is emitted. The third output is the output of the sensor corresponding to the period when the light in the third color (such as blue (B)) is emitted. The detection circuit 15 adjusts at least two or more of the first output, the second output, and the third output based on the adjustment coefficients derived so as to equalize the fourth output, the fifth output, and the sixth output, thereby reducing the effect of the variations in luminance of the light source emitting the light in the first color (such as the first light source 22R), the light source emitting the light in the second color (such as the second light source 22G), and the light source emitting the light in the third color (such as the third light source 22B). Thus, the detection accuracy of colors can be increased. The fourth output is the output obtained when the sensor is directly irradiated with the light in the first color from the light source (such as the first light source 22R). The fifth output is the output obtained when the sensor is directly irradiated with the light in the second color from the light source (such as the second light source 22G). The sixth output is the output obtained when the sensor is directly irradiated with the light in the third color from the light source (such as the third light source 22B).

The sensor panel (such as the sensor panel 10) having the detection area (such as the detection area SA) provided with a plurality of the sensors (such as the sensors WA) is provided. The adjustment coefficients correspond to the average value (AVE) of the outputs of the sensors. The detection circuit adjusts the first output, the second output, and the third output described above. Thereby, the degree of adjustment of the first output, the second output, and the third output can be reduced. Thus, distortions of the output due to the adjustment can be more reliably reduced.

The sensor panel (such as the sensor panel 10) having the detection area (such as the detection area SA) provided with a plurality of the sensors (such as the sensors WA) is provided. The adjustment coefficients correspond to the luminance distribution of the light in the first color (such as Graph RP1) in the detection area when the fourth output is obtained. The fourth output is the output obtained when the sensor is directly irradiated with the light in the first color (such as red (R)) from the light source (such as the first light source 22R). The detection circuit adjusts the second output and the third output described above. Thereby, the adjustment of the first output described above can be omitted and the processing load for the adjustment can be further reduced.

The first color is red (R), the second color is green (G), and the third color is blue (B). Therefore, color information according to what is called RGB can be obtained. That is, the color information according to what is called RGB can be obtained by the sensors (such as the sensors WA) that are not provided by color.

In the embodiment, the detection system 1 includes the information processing device (information processing device 30) coupled to the detection apparatus (for example, the detection apparatus 60). The detection circuit 15 of the detection apparatus individually acquires the first output, the second output, and the third output. The first output is the output of the sensor corresponding to the period when the light in the first color (such as red (R)) is emitted. The second output is the output of the sensor corresponding to the period when the light in the second color (such as green (G)) is emitted. The third output is the output of the sensor corresponding to the period when the light in the third color (such as blue (B)) is emitted. The information processing device (information processing device 30) adjusts the data corresponding to at least two or more of the first output, the second output, and the third output based on the adjustment coefficients derived so as to equalize the fourth output, the fifth output, and the sixth output, thereby reducing the effect of the variations in luminance of the light source emitting the light in the first color (such as the first light source 22R), the light source emitting the light in the second color (such as the second light source 22G), and the light source emitting the light in the third color (such as the third light source 22B). Thus, the detection accuracy of colors can be increased. The fourth output is the output obtained when the sensor is directly irradiated with the light in the first color from the light source (such as the first light source 22R). The fifth output is the output obtained when the sensor is directly irradiated with the light in the second color from the light source (such as the second light source 22G). The sixth output is the output obtained when the sensor is directly irradiated with the light in the third color from the light source (such as the third light source 22B).

Of the specific configurations described in the embodiment, such as the specific configuration of the sensor WA and the specific configuration of the wiring area VA described with reference to FIG. 2, configurations not specified in the claims can be changed as appropriate within the scope capable of achieving the configurations specified in the claims.

Other operational advantages accruing from the aspects described in the present embodiment that are obvious from the description herein, or that are conceivable as appropriate by those skilled in the art will naturally be understood as accruing from the present disclosure.

What is claimed is:

1. A detection apparatus comprising:
   a sensor that includes a photodiode to detect light and is configured to produce an output corresponding to a degree of the detected light;
   a detection circuit configured to acquire the output of the sensor; and
   a light source configured to switchably emit light in a first color, light in a second color, and light in a third color, wherein
   the detection circuit is configured to individually acquire a first output, a second output, and a third output,
   the first output is an output of the sensor corresponding to a period when the light in the first color is emitted,
   the second output is an output of the sensor corresponding to a period when the light in the second color is emitted,
   the third output is an output of the sensor corresponding to a period when the light in the third color is emitted,
   the detection circuit is configured to adjust at least two or more of the first output, the second output, and the third output based on adjustment coefficients derived so as to equalize a fourth output, a fifth output, and a sixth output,
   the fourth output is an output obtained when the sensor is directly irradiated with the light in the first color from the light source,
   the fifth output is an output obtained when the sensor is directly irradiated with the light in the second color from the light source, and
   the sixth output is an output obtained when the sensor is directly irradiated with the light in the third color from the light source.

2. The detection apparatus according to claim 1, comprising a sensor panel that comprises a detection area provided with a plurality of the sensors, wherein
   the adjustment coefficients correspond to an average value of the outputs of the sensors, and
   the detection circuit is configured to adjust the first output, the second output, and the third output.

3. The detection apparatus according to claim 1, comprising a sensor panel that comprises a detection area provided with a plurality of the sensors, wherein
   the adjustment coefficients correspond to a luminance distribution of the light in the first color in the detection area when the fourth output is obtained, and
   the detection circuit is configured to adjust the second output and the third output.

4. The detection apparatus according to claim 1, wherein
   the first color is red,
   the second color is green, and
   the third color is blue.

5. A detection system comprising a detection apparatus and an information processing device coupled to the detection apparatus, wherein
   the detection apparatus comprises:
   a sensor that includes a photodiode to detect light and is configured to produce an output corresponding to a degree of the detected light;
   a detection circuit configured to acquire the output of the sensor; and
   a light source configured to switchably emit light in a first color, light in a second color, and light in a third color, wherein
   the detection circuit is configured to individually acquire a first output, a second output, and a third output, and transfer data corresponding to each of the outputs to the information processing device,
   the first output is an output of the sensor corresponding to a period when the light in the first color is emitted,
   the second output is an output of the sensor corresponding to a period when the light in the second color is emitted,
   the third output is an output of the sensor corresponding to a period when the light in the third color is emitted,
   the information processing device is configured to adjust the data corresponding to at least two or more of the first output, the second output, and the third output based on adjustment coefficients derived so as to equalize a fourth output, a fifth output, and a sixth output,
   the fourth output is an output obtained when the sensor is directly irradiated with the light in the first color from the light source,
   the fifth output is an output obtained when the sensor is directly irradiated with the light in the second color from the light source, and
   the sixth output is an output obtained when the sensor is directly irradiated with the light in the third color from the light source.

* * * * *